United States Patent [19]

Nobusawa

[11] 4,317,623
[45] Mar. 2, 1982

[54] MEMORY USED IN AUTOMATIC EXPOSURE CONTROL MECHANISM

[75] Inventor: Tsukumo Nobusawa, Tokyo, Japan

[73] Assignee: Asahi Kogaku Kohyo Company Limited, Tokyo, Japan

[21] Appl. No.: 182,767

[22] Filed: Aug. 29, 1980

[30] Foreign Application Priority Data

Sep. 3, 1979 [JP] Japan .................. 54-111796

[51] Int. Cl.$^3$ .............................................. G03B 7/00
[52] U.S. Cl. .................................. 354/60 A; 354/50; 354/51; 354/43
[58] Field of Search ............. 354/50, 51, 60 R, 60 A, 354/43

[56] References Cited

U.S. PATENT DOCUMENTS

| | | | |
|---|---|---|---|
| 3,712,191 | 1/1973 | Nobusawa | 354/60 A |
| 3,858,224 | 12/1974 | Heaney | 354/60 A |
| 3,858,226 | 12/1974 | Nakagawa et al. | 354/60 A |
| 4,048,643 | 9/1977 | Arita | 354/60 A |

Primary Examiner—Russell E. Adams
Attorney, Agent, or Firm—Finnegan, Henderson, Farabow, Garrett & Dunner

[57] ABSTRACT

In a through-the-lens, single lens reflex camera wherein light reflected from an object to be photographed is intercepted when a quick-release mirror jumps up in response to the depression of a shutter button to one of a plurality of positions, a system for generating and supplying a voltage signal corresponding to the intensity of the reflected light for use in a circuit for opening and closing the camera shutter or a circuit for opening or closing the camera diaphragm. An input pulse generator generates an input pulse signal having a first frequency related to the intensity of the light reflected from the object to be photographed and a reference pulse generator generates a reference pulse signal having a second frequency. A phase lock loop generates a control pulse signal having a third frequency and compares the frequency of the input pulse signal to the frequency of the control pulse signal when the reflected light is not intercepted by the quick-release mirror to produce and supply the voltage signal to the shutter or diaphragm circuit, and adjusts the frequency of the control pulse signal and the reference pulse signal to coincide with the frequency of the input pulse signal. When the quick-release mirror intercepts the reflected light, the reference pulse signal is supplied to the phase lock loop to maintain the generation of the output pulse signal. The reference pulse signal generator can be embodied by a second phase lock loop.

10 Claims, 9 Drawing Figures

MEMORY USED IN AUTOMATIC EXPOSURE CONTROL MECHANISM

FIELD OF THE INVENTION

The present invention relates to a memory for incorporation into an electrically controlled shutter or an automatic diaphragm of a through-the-lens type camera.

BACKGROUND OF THE INVENTION

When an electrically controlled shutter or an automatic diaphragm, wherein light measuring is performed with a photosensitive element disposed in the path of light entering the photographic optical system, is incorporated into a through-the-lens type, single lens, reflex camera, there occurs a disturbance in the internal resistance of the photosensitive element due to the springing up of the quick return mirror. To overcome such a problem, there has already been proposed a means to store the information converted from the intensity of light reflected from an object to be photographed and then to control the shutter operation in accordance with the stored information. In such means a capacitor storage device has been utilized to store the intensity information but such a storage means is disadvantageous because the longer the shutter time is, the more serious the influence of capacitor leak current upon the information stored and the larger the capacity of the storing capacitor must be. This results in a longer time required for both charge and discharge of the capacitor and a more serious problem arising from the chattering of the switch connected to the discharge circuit for the capacitor.

OBJECTS AND SUMMARY OF THE INVENTION

It is an object of the present invention to provide a memory for use in an automatic exposure control mechanism to store light intensity data.

Another object of the present invention is to provide a memory for storing light intensity data in an automatic exposure control mechanism in a manner that will not disturb the internal resistance of the photosensitive element.

Still another object of the present invention is to provide a memory including a phase locked loop (PLL) for generating a voltage variance signal to control the exposure control mechanism in accordance with stored light intensity data.

To achieve these and other objects, and in accordance with the purpose of the invention, as embodied and broadly described herein, the phase synchronizing automatic exposure control system includes a memory adapted to store a pulse signal provided from a photoelectric conversion pulse generator circuit including a photosensitive element disposed in a path of light reflected from an object to be photographed prior to opening of the shutter to automatically adjust the exposure on the basis of the stored pulse signal, the memory comprising a phase locked loop receiving the pulse signal, means for generating a reference pulse signal having its frequency determined according to an internal circulating signal of the phase locked loop, and changeover means for supplying the reference pulse signal to the phase locked loop instead of the pulse signal prior to the opening of the shutter.

Accordingly to the present invention, diaphragm control can be achieved by an error DC voltage signal produced by the phase locked loop in accordance with the intensity of light reflected from an object to be photographed while shutter control can be achieved with the pulse output signal of the phase locked loop for appropriate exposure.

Alternatively, the memory according to the present invention may comprise a first phase locked loop for receiving pulse information provided from a photoelectric conversion pulse generator including a photosensitive element disposed in the path of light coming from the object to be photographed and for generating an output signal, a second phase locked loop receiving the output signal of the first phase locked loop, and changeover means for selectively applying the output signal of the second phase locked loop as an input to the first phase locked loop instead of the pulse information.

The accompanying drawings, which are incorporated in and constitute a part of this specification, illustrate various embodiments of the invention, and, together with the description, serve to explain the principles of the invention.

Figure 1:
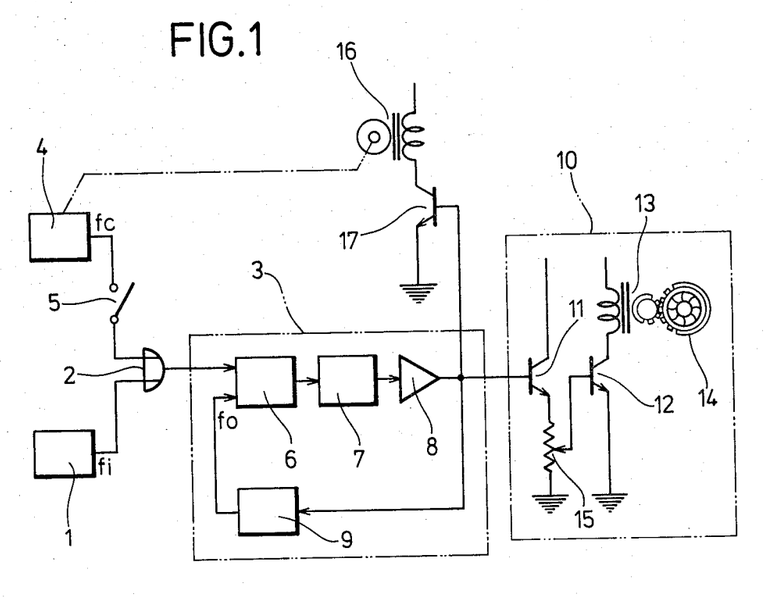
FIG. 1 is a block diagram illustrating an embodiment of the memory according to the present invention as incorporated into an automatic diaphragm means.

Referring to FIG. 1, a photoelectric conversion pulse generator 1 generates a pulse signal having a frequency corresponding to the intensity of light reflected from an object to be photographed. The pulse signal is supplied through OR circuit 2 to a phase locked loop (PLL) 3. It should be noted that a waveform shaping circuit such as a monostable multivibrator can be provided between the photoelectric conversion pulse generator 1 and the OR circuit 2.

Figure 3:
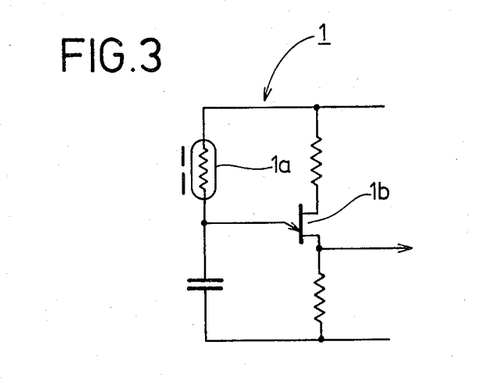
FIG. 3 is a detailed circuit diagram illustrating an embodiment of the photoelectric conversion pulse generator included in the memory of FIG. 1.

As embodied herein, the photoelectric conversion pulse generator may comprise a unijunction transistor (UJT) oscillator as illustrated in FIG. 3. The UJT oscillator illustrated in FIG. 3 includes a photoconductive element 1a disposed in the path of the light reflected from the object to be photographed and a unijunction transistor 1b receiving the output of the photoconductive element 1a and producing a pulse signal with a frequency corresponding to the intensity of the light reflected from the object to be photographed.

Referring again to FIG. 1, a reference pulse generator 4 generates a reference pulse signal which is supplied to switch 5. Switch 5 is normally open but is closed in response to the depression of a shutter button or the like prior to the springing up of the quick return mirror in a photographic device. When switch 5 is closed, the reference pulse signal is supplied through the OR circuit 2 to the PLL circuit 3. As embodied herein, the pulse signal provided by the photoelectric conversion pulse generator 1 is interrupted when the reference pulse signal is supplied to PLL circuit 3 upon the closing of switch 5 because of the interception of the reflected light from the object to be photographed by the quick return mirror.

Figure 2:
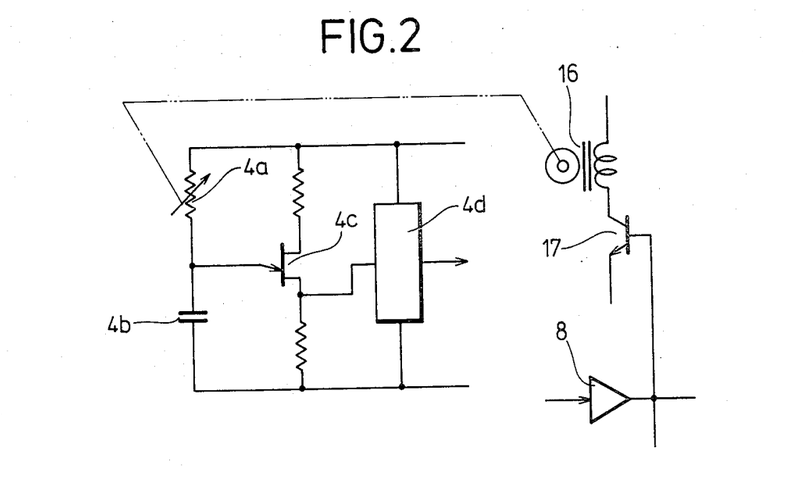
FIG. 2 is a detailed circuit diagram illustrating the reference pulse generator included in the memory of FIG. 1.

As embodied herein, the reference pulse generator 4 comprises a unijunction transistor oscillator as illustrated in FIG. 2 combined with other well-known circuitry such as a monostable multivibrator for shaping the waveform of the reference output signal from the reference pulse generator 4. Referring to FIG. 2, a variable resistance 4a is coupled to a rotary magnet 16 in a manner that will be described in more detail later. A timing capacitor 4b is coupled to one end of the variable resistance 4a as is unijunction transistor 4c. A monostable multivibrator 4d receives the output of the unijunction transistor 4c and performs waveform shaping on the output of the unijunction transistor 4c to produce a well-defined reference output signal.

Again referring to FIG. 1, the PLL circuit 3 comprises a phase detector or comparator 6 receiving as one input the output of the OR circuit 2, a low pass filter receiving the output of the phase detector 6, an amplifier 8 for amplifying the output of the low pass filter 7 and a voltage control oscillator 9 receiving the output of the amplifier 8 and producing an output signal $f_o$ which is supplied as an input to the phase detector 6.

Figure 4:
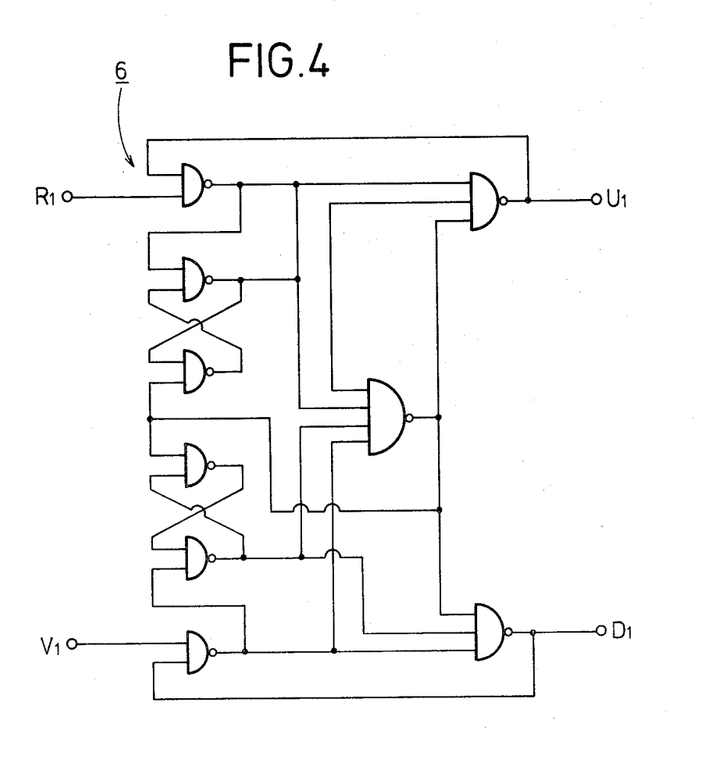
FIG. 4 is a detailed circuit diagram illustrating an embodiment of a phase detector included in the memory of FIG. 1.

Phase detector 6 can be embodied as a well-known digital integrated circuit as illustrated in FIG. 4. A phase detector of this type, particularly that in the form of a phase frequency comparator, has an advantageously wide lock range. In such an integrated circuit, the output $U_1$ assumes a low level when the frequency of the input signal $V_1$ is lower or delayed in phase relative to the input signal $R_1$. The output signal $D_1$ assumes a low level when the frequency of input signal $R_1$ is lower or delayed in phase with respect to the frequency of input signal $V_1$. Both output signals $U_1$ and $D_1$ assume high values when the input signals $V_1$ and $R_1$ are synchronous in their respective phases. A high value for both of the outputs $U_1$ and $D_1$ will cause the oscillation frequency of the voltage controlled oscillator 9 to become constant and to be in coincidence with the frequency of the output signal of the photoelectric conversion pulse generator 1. A suitable charge pump can be connected between the phase detector 6 and the low pass filter 7 as would be understood by one of ordinary skill in the art.

Figure 5:
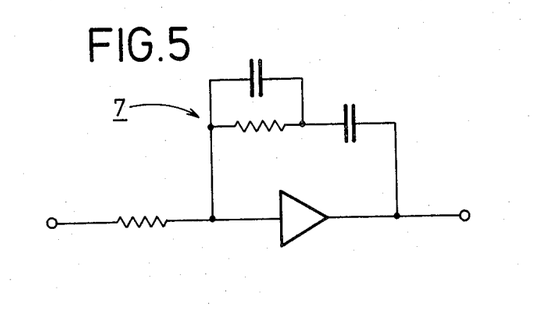
FIG. 5 is a detailed circuit diagram illustrating an embodiment of a low pass filter included in the memory of FIG. 1.

As herein embodied, the low pass filter 7 comprises an active filter embodied as illustrated in FIG. 5. The output of the low pass filter 7, sometimes called the error DC voltage or simply the error voltage $V_d$ is equal to zero when the frequencies of both inputs to the phase detector 6 establish the relationship $f_i = f_o$ and $f_i$ represents the output frequency of the photoelectric conversion pulse generator 1 and $f_o$ represents the output frequency of the voltage control oscillator 9. It should be readily understood that FIG. 5 merely illustrates a basic circuit arrangement which can also be modified to include a charge pump as has been known to be used in the art.

Figure 6:
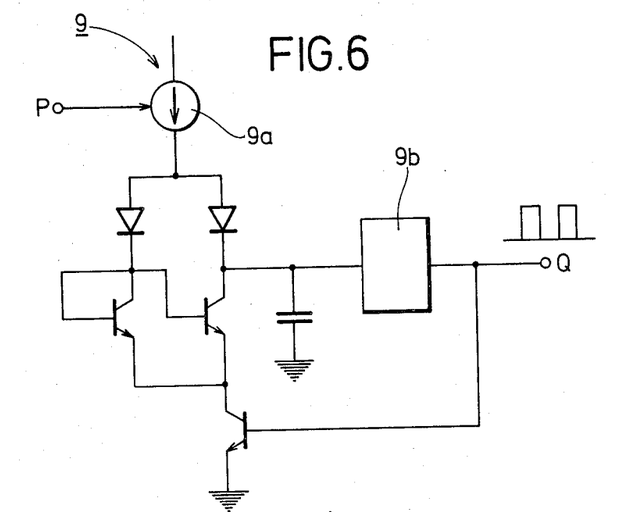
FIG. 6 is a detailed circuit diagram illustrating an embodiment of a voltage controlled oscillator included in the memory of FIG. 1.

FIG. 6 illustrates an embodiment of the voltage control oscillator 9. In the circuit illustrated in FIG. 6, a square wave output having a frequency $f_o$ is produced at output terminal Q when the error DC voltage $V_d$ is applied to the control input terminal P. Constant current source 9a receives the control input signal from terminal P and supplies it through parallel diodes and transistors to a Schmidt trigger 9b.

The phase detector 6, the low pass filter 7, and the voltage control oscillator 9 are well-known circuits so that no further detailed explanation of their arrangements is necessary here. These components may be constituted by circuit arrangements other than those illustrated in FIGS. 4, 5, and 6.

Again referring to FIG. 1, the error DC voltage $V_d$ of the PLL circuit 3 is applied to a diaphragm driving circuit 10. The diaphragm driving circuit 10 comprises transistors 11 and 12 for amplifying the error DC voltage $V_d$, rotary magnet 13 supplied with the amplified current from transistor 12, and diaphragm means 14. A variable resistance 15 is connected to the emitter side of transistor 11 for adjustment of film sensitivity. The error DC voltage $V_d$ is supplied to an amplifying transistor 17 to energize a rotary magnet 16 which, as seen from FIG. 2, automatically adjusts the resistance of variable resistor 4a of the reference pulse generator 4 so that the output frequency of the reference pulse generator 4 corresponds to the level of the error DC voltage $V_d$.

In the present embodiment, as described above, upon closure of a source switch (not shown), the photoelectric conversion pulse generator 1, the reference pulse generator 4, and the voltage controlled oscillator 9 each begins to oscillate. As a consequence, the pulse signal generated by conversion pulse generator 1 has a frequency of $f_i$ and a square wave signal with a frequency $f_o$ is generated by the voltage controlled oscillator 9. The signals $f_i$ and $f_o$ are applied to the phase detector 6 which produces an output signal representing any phase difference between the signals $f_i$ and $f_o$.

The low pass filter 7 is supplied with the output signal from the phase detector 6 and integrates the output of the phase detector 6 to produce the error DC voltage $V_d$ which is amplified by the amplifier 8 and supplied as an input to the voltage controlled oscillator 9. The voltage controlled oscillator 9, as explained above, generates an output signal with a frequency $f_o$ and adjusts the frequency of $f_o$ in accordance with the amplified input signal so that the frequency of $f_o$ approaches the frequency of $f_i$. In such a feedback manner, the relationship $f_i = f_o$ is obtained and the voltage controlled oscillator 9 will maintain a constant frequency output.

The diaphragm means 14 operates in accordance with the application of the error DC voltage $V_d$ from the PLL circuit 3 and controls the lens aperture in accordance with the magnitude of the error DC voltage $V_d$. It can be determined that the relationship $f_i = f_o$ corresponds to the lens aperture or stop value associated with the intensity of light reflected from an object to be photographed.

The output frequency $f_o$ of the reference pulse generator 4 also depends upon the magnitude of the error DC voltage $V_d$ and, therefore, the frequency $f_c$ is also stabilized when the frequency condition of the PLL circuit 3 obtains the state where $f_i = f_o$. In view of this fact, the output frequency $f_c$ corresponds to the error DC voltage $V_d$ and it is possible to adjust the respective circuits so as to establish the relationship $f_c = f_i$.

Upon depression of the shutter button under this condition, the normally open switch 5 is closed at the first stage of the depression and the mirror springs up at the second stage. Upon springing up of the mirror, the light incident upon the photoconductive element 1a is intercepted and thereby ocillation of the photoelectric conversion pulse generator 1 is stopped. The generator 1 therefore generates an output signal of extremely low frequency which does not exert any influence upon the diaphragm means for a time since the phase lock loop circuit is continually supplied with the reference pulse signal having frequency $f_c$ until the condition $f_c = f_o$ ($f_c = f_i$) is maintained.

Depressing of the shutter button, under this condition, to the final stage of the depression initiates shutter operation. Upon release of the shutter button, the switch 5 is opened and the phase lock loop circuit 3 is again supplied with the pulse signal produced by the photoelectric conversion pulse generator 1 so that the diaphragm means 14 will be controlled in accordance with the intensity of light reflected from the object to be photographed at the moment.

If the transistor 17 which energizes the rotary magnet 16 is replaced by an operational amplifier, it becomes possible to change the degree of amplification. Furthermore, incorporation of a semiconductor element into the amplifier enables various output signals, e.g., functional output signals of the error DC voltage $V_d$, to be generated so that the output frequency $f_c$ of the reference pulse generator 4 can be brought into coincidence with the output frequency $f_i$ of the photoelectric conversion pulse generator 1.

Figure 7:
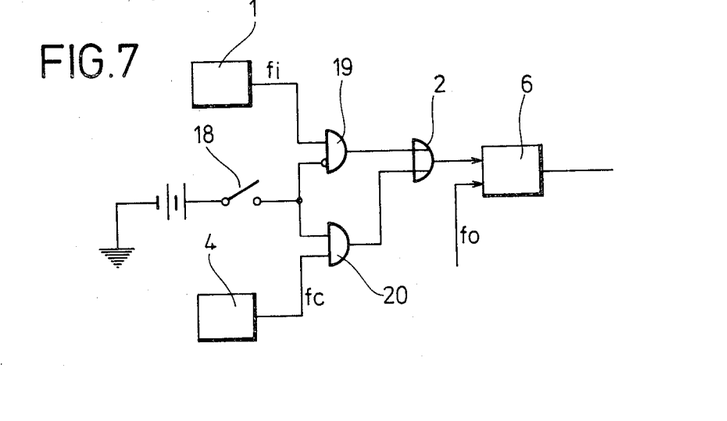
FIG. 7 is a detailed circuit diagram illustrating an embodiment of a changeover circuit included in the memory of FIG. 1.

FIG. 7 illustrates an embodiment of the invention wherein the switch 5 is replaced by a changeover means comprising switch 18, AND gate 19, and AND gate 20. AND gate 19 includes a first inverted input terminal coupled to one side of switch 18. The other side of switch 18 is coupled to ground through a battery. The other input to AND gate 19 is the output signal $f_i$ produced by photoelectric conversion pulse generator 1. AND gate 20 also includes an input terminal connected to one side of switch 18 and another input terminal connected to the reference pulse generator 4. The outputs of AND gates 19 and 20 are provided to OR gate 2.

The AND gate 19 remains open, i.e., passes the frequency signal $f_i$, as long as switch 18 is open to allow the pulse information from the photoelectric conversion pulse generator 1 to be applied through gating circuit 19 and OR circuit 2 to the phase detector 9. Upon closing the switch 18, and immediately before the springing up of the mirror, AND gate 19 ceases to pass the pulse information from the photoelectric conversion pulse generator 1 and AND gate 20 transfers the reference pulse signal from reference pulse generators 4 through OR circuit 2 to the phase detector 9.

Figure 8:
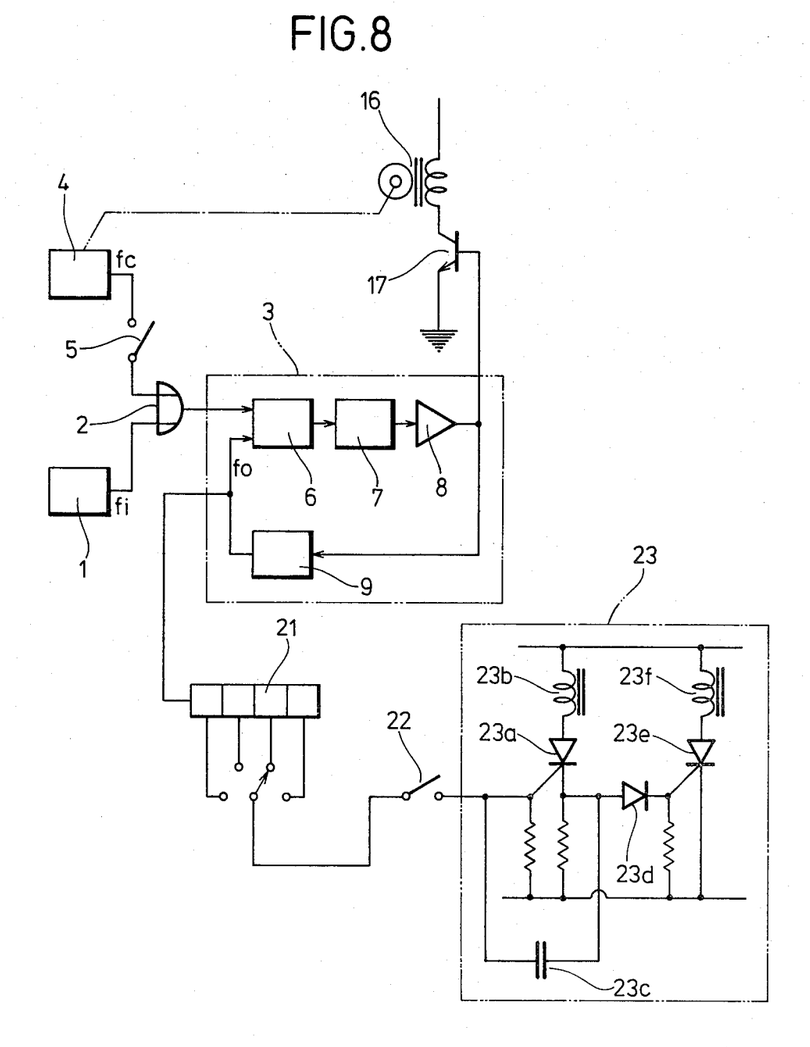
FIG. 8 is a block diagram illustrating an embodiment of the memory according to the present invention as incorporated into an electrically controlled shutter.

FIG. 8 illustrates an embodiment wherein a memory constructed according to the teachings of the present invention is incorporated into an electrically controlled shutter mechanism. The circuit components constituting the memory in the embodiment illustrated in FIG. 8 are identical to those which constitute the embodiment of FIG. 1 and accordingly are designated by common reference numerals.

Referring to FIG. 8, a voltage divider 21 is provided to accommodate adjustments of film sensitivity, switch 22, which is in a normally open condition, is closed upon depression of the shutter button to the final stage of depression and a shutter driving circuit 23 opens and closes the shutter.

The manner in which the memory of the present invention operates in the embodiment of FIG. 8 is identical to its method of operation in the embodiment of FIG. 1; namely, the photoelectric conversion pulse information signal is intercepted immediately before the mirror springs up and the reference pulse signal is applied to the phase lock loop circuit 3. When this occurs, the frequency relationship $s_c = s_o$ ($s_c = s_i$) is established in the phase lock loop circuit 3 at which time the shutter button is depressed to the final stage of depression to close the switch 22. The first square wave signal produced by the voltage control oscillator 9 after closure of the switch 22 is applied through the voltage divider 21 and the closed switch 22 to the gate of an SCR 23a. The SCR 23a becomes conductive at that point so that electromagnet 23b is excited to open the shutter. Although the first square wave signal is also applied through a capacitor 23c and a diode 23d to the gate of another SCR 23e, the SCR 23e remains non-conductive since no forward bias of the diode 23d occurs during this operation. When the second square wave signal is generated from the voltage controlled oscillator 9 to the shutter driving circuit 23, SCR 23e becomes conductive and causes electromagnet 23f to close the shutter.

The relationship $f_o = f_c = f_i$ is established as long as the phase lock loop circuit 3 satisfies the frequency relationship $f_c = f_o$ which means that the period of the square wave signal produced by the voltage controlled oscillator 9 corresponds to the intensity of the light reflected from the object to be photograhed. It is possible to alter the embodiment illustrated in FIG. 8 by substituting an operational amplifier for transistor 17 such that the changeover means illustrated in FIG. 7 can be employed.

Figure 9:
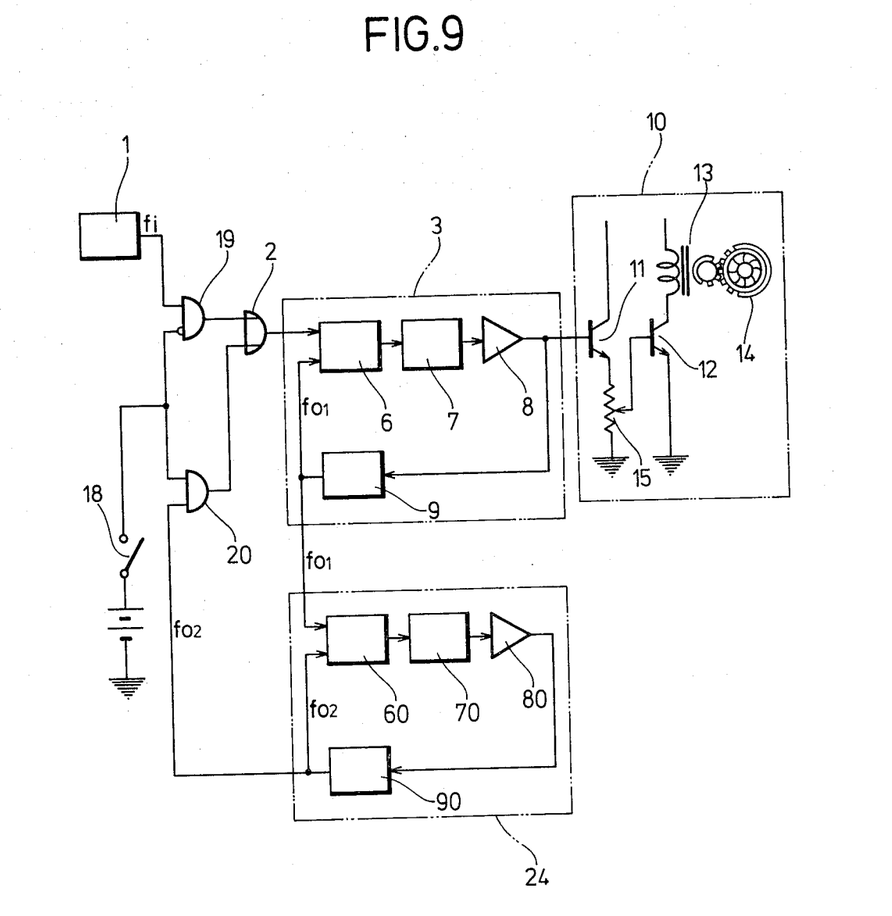
FIG. 9 is a block diagram illustrating an alternate embodiment of the memory according to the present invention as incorporated into an automatic diaphragm device.

FIG. 9 illustrates another embodiment of the present invention wherein the reference pulse generator 4 has been replaced by a second phase lock loop circuit 24. Phase lock loop circuit 24 is identical to the phase lock loop circuit 3 in the sense that it includes a phase detector 60, low pass filter 70 connected to the phase detector 60, amplifier 80 connected to the output of low pass filter 70, and voltage controlled oscillator 90 connected to the output of amplifier 80.

In the embodiment illustrated in FIG. 9, upon closure of the source switch (not shown), the photoelectric conversion pulse generator 1 generates the pulse signal having a frequency designated $f_i$ which is applied as an input signal to the first phase lock loop circuit 3 until the internal frequency $f_{o1}$ generated by voltage control oscillator 9 results in the attainment of the relationship $f_{o1} = f_i$. At that time, the error DC voltage $V_d$ is applied to diaphragm driving circuit 10 to control the opening and closing of the lens aperture. A square wave output signal generated by voltage controlled oscillator 9 in the course of such operation is applied to the phase detector 60 of the second phase lock loop circuit 24 and, as a result, the second phase lock loop circuit 24 operates so that the relationship $f_{o1} = f_{o2}$ is obtained where $f_{o2}$ represents the output frequency of the voltage controlled oscillator 90.

When $f_{o1} = f_{o2}$ is obtained, further depression of the shutter button results in switch 18 being closed immediately before the mirror springs up so that the pulse information from the photoelectric conversion pulse generator 1 is intercepted by AND gate 19 and simultaneously the output signal having frequency $f_{o2}$ generated by the voltage controlled oscillator 90 of the second phase lock loop circuit 24 is applied through the AND gate 20 and the OR circuit 2 as an input to the first phase lock loop circuit 3.

When the relationships $f_{o2}=f_{o1}$ and $F_{o2}=f_i$ are obtained, the first phase lock loop circuit 3 no longer exhibits a change in its internal frequency $f_{o2}$ and error DC voltage $V_d$ becomes zero. Accordingly, the diaphragm means 14 maintains a lens opening value controlled in accordance with the intensity of light reflected from an object to be photographed. Under such a situation, the information stored by the first phase lock loop circuit 3 no longer exerts an influence upon the pulse signal produced by the photoelectric conversion pulse generator 1 and the shutter button may be further depressed to effect springing up of the mirror and operation of the shutter.

With the embodiment as illustrated in FIG. 9, the frequency condition $f_{o1}=f_{o2}=f_i$ is satisfied by the operations of the first and second phase lock loop circuits 3 and 24, respectively, so that the first phase lock loop circuit 3 achieves exact coincidence in the phase and frequency and there is no longer a need for the mechanical arrangement such as rotary magnet 16 illustrated in FIG. 1. The embodiment of the memory as illustrated in FIG. 9 may also be combined with the shutter driving circuit 23 illustrated in FIG. 8 to be used as a memory associated with an electrically controlled shutter.

The changeover means or the changeover circuit comprising switch 18, AND gate 19, and AND gate 20 provided in the embodiment of FIG. 9 theoretically takes no time for its actuation but in practice exhibits a slight time delay. This means that, after interception of the photoelectric pulse information generated by photoelectric pulse signal generator 1, there is a danger of the application of the output signal from the voltage controlled oscillator 90 as an input of the first phase lock loop circuit 3. To avoid this, there may be provided a delay circuit as known in the art to assure that the AND gate 19 is closed only after AND gate 20 is opened. With such an arrangement, the pulse information from the photoelectric conversion pulse generator 1 and the output signal from the voltage controlled oscillator 90 will be simultaneously applied to the first phase lock loop circuit 3 even if for only an extremely short time duration. This results in the pulse information generated by photoelectric conversion pulse generator 1 and the output signal from voltage controlled oscillator 90 being superimposed on each other as they pass through OR circuit 2 to result in an increase in amplitude. Such an increase in amplitude can be effectively limited by the addition of a limiter as is known in the art.

It will be apparent from the foregoing description and explanation that provision of a memory constructed according to the present invention provides various advantages such as the elimination of leak current to enable the maintenance of stored light intensity information even when the shutter time has been set for long exposure periods. This is because the memory of the present invention continues its operation of storing information as long as it is applied with the oscillation signal from the reference pulse generator 4 or the second phase lock loop circuit 24. It is possible to store the level of intensity of light reflected from one object to be photographed with a high degree of precision because detection of the light intensity is achieved by the method of bringing the phase and frequency representing the reflected light into coincidence with the phase and frequency of a reference voltage signal. It is also easily possible to incorporate the memory of the present invention into an electrically controlled shutter or an automatic diaphragm means because the memory according to the present invention employs a phase lock loop circuit which is fabricated in the form of an integrated circuit.

It will be further apparent to those skilled in the art, that numerous modifications and variations can be made to the embodiments of the memory of the instant invention without departing from the scope or the spirit of the invention and it is intended that the present invention cover the modifications and variations of the memory provided that they come within the scope of the appended claims and their equivalents.

What is claimed is:

1. In a through-the-lens, single lens reflex camera wherein light reflected from an object to be photographed is intercepted when a quick-release mirror jumps up in response to the depression of a shutter button to one of a plurality of positions, a memory system for supplying a voltage output signal adapted for use in a circuit for controlling the opening and closing of the camera shutter or a circuit for controlling the opening and closing of the camera diaphragm, said system comprising:

first pulse generating means for generating an input pulse signal having a first pulse frequency corresponding to the intensity of light reflected from said object;

a second pulse generating means for generating a reference pulse signal having a second pulse frequency;

third pulse generating means for generating a control pulse signal having a third pulse frequency, said third pulse generating means including means for comparing said third pulse frequency first to said first pulse frequency when said reflected light is not intercepted by said quick release mirror and second with said second pulse frequency when said reflected light is intercepted by said quick-release mirror, for generating said voltage output signal having a magnitude corresponding first to the difference in frequency between said first pulse frequency and said third pulse frequency and second to the difference in frequency between said second pulse frequency and said third pulse frequency, and for adjusting the frequency of said control pulse signal and the frequency of said reference pulse signal in response to the magnitude of said voltage output signal to cause said frequencies of said control pulse signal and said reference pulse signal to coincide with the frequency of said input pulse signal.

2. A system as in claim 1 wherein said second pulse generating means comprises:

a timing capacitor;

a variable resistor coupled to said timing capacitor;

a first unijunction transistor coupled to said timing capacitor for producing said reference pulse signal; and a monostable multivibrator for performing waveform shaping on said reference pulse signal produced by said first unijunction transistor.

3. A system as in claim 2 wherein said second pulse generating means includes reference pulse control means for adjusting said frequency of said reference pulse signal in accordance with the magnitude of said voltage output signal such that the frequency of said reference pulse signal coincides with the frequency of said input pulse signal.

4. A system as in claim 3 wherein said reference pulse control means comprises a rotary magnet for dynamically controlling the resistance of said variable resistor in accordance with the magnitude of said voltage output signal to alter the time constant of said timing capacitor to thereby control the frequency of said reference pulse signal.

5. A system as in claim 1 wherein said input pulse signal generating means comprises:
 a photodetector for receiving said reflected light from said object to be photographed and for generating a light intensity signal having a frequency corresponding to the intensity of said received reflected light; and
 a second unijunction transistor receiving said light intensity signal for outputting said input pulse signal in accordance with said received light intensity signal.

6. A system as in claim 1 wherein said third pulse generating means comprises:
 a frequency comparator having a first input terminal for receiving either said input pulse signal or said reference pulse signal and a second input terminal for receiving said control pulse signal, said frequency comparator for generating a voltage comparison signal having a magnitude corresponding to the difference in frequency between signals received on said first and second input terminals;
 a low pass filter receiving said voltage comparison signal and for producing a filtered voltage comparison signal;
 an amplifier for amplifying said filtered voltage comparison signal; and
 a voltage controlled oscillator receiving said amplified filtered voltage comparison signal for producing said control pulse signal having a frequency corresponding to the magnitude of said received amplified filtered voltage comparison signal.

7. A system as in claim 6 further including switch means for selectively supplying said input pulse signal to said first input terminal of said frequency comparator when said reflected light is not intercepted by said jumping up of said quick-release mirror and said reference pulse signal to said first input terminal of said frequency comparator when said reflected light is intercepted by said jumping up of said quick-release mirror.

8. In a through-the-lens, single lens reflex camera wherein light reflected from an object to be photographed is intercepted when a quick-release mirror jumps up in response to the depression of a shutter button to one of a plurality of positions, a memory system for supplying a voltage signal for use in a circuit for opening and closing the shutter of the camera or in a circuit for opening and closing the diaphragm of the camera, said system comprising:
 a first phase lock loop for producing a reference pulse signal having a first frequency;
 input pulse signal generating means for generating an input pulse signal having a second pulse frequency corresponding to the intensity of said light reflected from said object;
 a second phase lock loop having a first input terminal for receiving said input pulse signal when said reflected light is not intercepted by said jumping up of said quick-release mirror and said reference pulse signal when said reflected light is intercepted by said jumping up of said quick-release mirror and a second input terminal, said second phase lock loop for generating a control pulse signal having a third pulse frequency and supplying said control pulse signal to said second input terminal, said second pulse lock loop for comparing the frequency of said input pulse signal received by said first input terminal with said frequency of said control pulse signal received by said second input terminal and for adjusting the frequency of said control pulse signal to coincide with the frequency of said input pulse signal, said second phase lock loop for controlling said first phase lock loop to adjust the frequency of said reference pulse signal to coincide with the frequency of said control pulse signal and for producing said voltage signal having a voltage level corresponding to the difference in frequency between a said pulse signal received by said first input terminal and said control pulse signal received by said second input terminal.

9. A system as in claim 8 further including a switch means for supplying said input pulse signal to said first input terminal when said reflected light is not intercepted by said jumping up of said quick-release mirror and for supplying said reference pulse signal to said first input terminal when said reflected light is intercepted by said jumping up of said quick-release mirror.

10. A system as in claim 9 wherein said input pulse generating means comprises:
 a photodetector for receiving said light reflected from said object to be photographed and for generating a light intensity signal having a frequency corresponding to the intensity of said received reflected light; and
 a unijunction transistor receiving said light intensity signal for outputtting said input pulse signal in accordance with said received light intensity signal.

* * * * *